Figure 1:
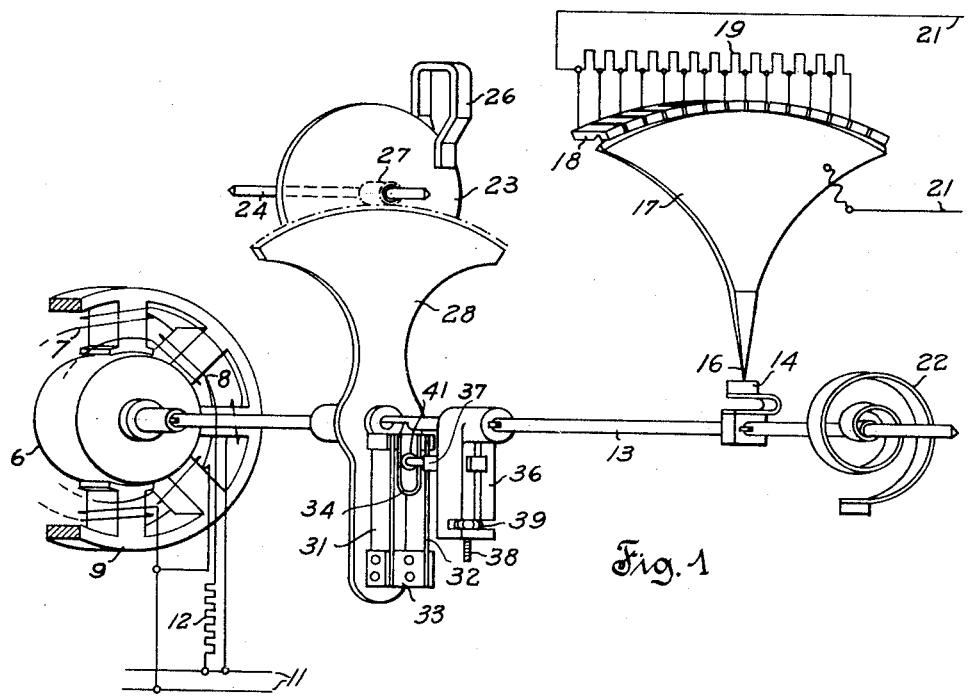

Feb. 12, 1935.  H. GÜTTINGER ET AL  1,991,322
ELECTRIC REGULATOR
Filed Sept. 21, 1933

Inventors
H. Güttinger
R. Keller
P. Martenet
by
Attorney

Patented Feb. 12, 1935

1,991,322

UNITED STATES PATENT OFFICE 1,991,322

ELECTRIC REGULATOR

Heinrich Güttinger, Wettingen, Robert Keller, Ennetbaden, and Pierre Martenet, Baden, Switzerland, assignors to Aktiengesellschaft Brown Boveri & Cie., Baden, Switzerland, a joint-stock company of Switzerland Application September 21, 1933, Serial No. 690,424
In Germany October 13, 1932

6 Claims. (Cl. 171—229)

This invention relates to improvements in regulators for use in electric systems and more particularly to regulators of the type in which a rheostat in the system is adjusted by rocking of a movable sector-shaped contact in engagement therewith in response to an electric value in the system to be regulated or in another system to thereby vary the amount of resistance in the circuit to be regulated.

Regulators of the rocking sector type in general comprise a motive or torque producing system of any suitable type operating in response to an electric value in the system, a damping or "anti-hunting" system operated by the motive system and preventing oscillatory overtravel of the regulator and a regulating system which includes a rheostat in the circuit to be regulated, the amount of resistance in the circuit being varied by a sector-shaped contact rocking in engagement with the several portions of the rheostat in response to operation of the motive system as modified by action of the damping system. The damping system is usually magnetic damping means mounted on the spindle connecting the motive and regulating systems and is attached to such spindle by a flexible and/or resilient connection to return the damping means to the proper position after each operation of the regulator. If a spring is used as such connection between the spindle and the damping means, such spring must be made adjustable to permit adjustment of the regulating action to the conditions of the system to which the regulator is applied. If the force of the spring does not vary exactly proportionally with the movement of the regulator, the regulating action is accelerated or retarded dependent on the direction of variation of the spring force from proportionality. Means must therefore be provided by which adjustment of the damping action to a definite relation with the action of the regulator may be obtained within wide limits and by which such relation may be varied dependent on the conditions of the system to be regulated.

It is, therefore, among the objects of the present invention to provide a connection between the spindle of a regulator of the rocking sector type and the damping means thereof which will permit exact adjustment of the connection to the desired action of the regulator within wide limits.

Another object of the present invention is to provide a connection between the spindle of a regulator of the rocking sector type and the damping means thereof in which the force of the connection changes in a manner other than proportionally to the action of the regulator.

Another object of the present invention is to provide a connection between the spindle of a regulator of the rocking sector type and the damping means thereof in which the damping action may be adjusted to a definite relation with the action of the regulator as a whole.

Figures 2, 3:
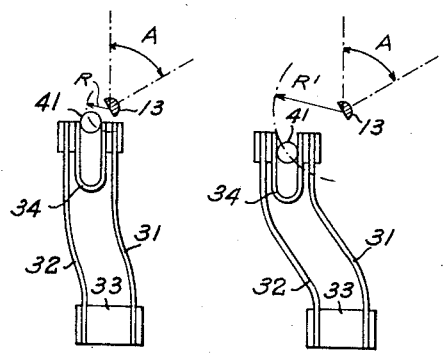
Figure 4:
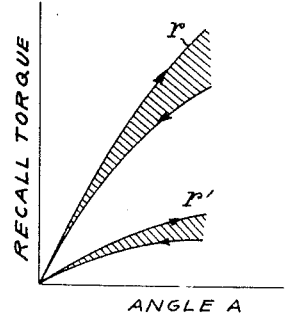

Objects and advantages other than those above set forth will be apparent from the following description when read in connection with the accompanying drawing, in which:

Fig. 1 is a somewhat diagrammatic perspective view of an electric regulator of the rocking sector type embodying the improved connection between the spindle of the regulator and the damping system thereof;

Figs. 2 and 3 are detailed views illustrating the flexible connection between the main spindle and the damping system of the regulator in different adjustments to obtain different degrees of acceleration in the movement of the damping system relative to the movement of the torque producing system; and Fig. 4 illustrates curves which define the different actions of the connection in the several positions illustrated in Figs. 2 and 3.

Referring more particularly to the drawing by characters of reference, the reference numeral 6 designates an armature which may be of the drum or other suitable type which is rotated due to the magnetic action thereon of field coils 7 and 8 mounted on a core structure 9 and supplied with potential from the supply line 11, the coils 8 being supplied through a resistor 12 to secure the torque producing magnetic field as is well known. The armature 6 is secured to and rotates a spindle 13 on which is resiliently mounted a jeweled cup 14 which supports the needle point 16 of a sector-shaped contact 17. The contact sector 17 rocks in engagement with taps 18 of a rheostat 19, thereby controlling the amount of the resistance in the circuit 21 which is to be controlled. The taps 18 are insulated from each other and are arranged in an arc, thereby affording a path on which the contact sector may rock upon movement of spindle 13. The spindle 13 is rotated due to the action of the torque producing system 6, 7, 8 and 9 against the force of a spring 22 which resists such rotation and tends to retain the spindle and the contact sector in the original positions thereof, one end of the spring being secured to the spindle and the other end thereof being secured to the casing (not shown) enclosing the regulator. Due to the fact that the torque produced by the motive system is proportional to the energization of the coils thereof, the spring may be so adjusted that the contact sector will engage predetermined taps thereby determining the amount of rheostat 19 in circuit 21 dependent on the potential of line 11. It will be understood that any number of contact sectors may be provided so that the contact pressures thereof balance each other to secure nearly frictionless movement of the regulator and to maintain the desired contact pressure on the taps.

The movement of spindle 13 is magnetically damped by a disk 23 rotating on a spindle 24 between the poles of a magnet 26. The spindle 24 has secured thereon a gear 27 which engages with a substantially sector-shaped gear 28 which is rotatably mounted on the spindle 13. The sector gear 28 is provided with leaf springs 31 and 32 mounted on a spacing block 33 extending from the portion of the sector gear on the side of the spindle 13 opposite the location of the damping disk 23. The free ends of the two leaf springs are joined by a U-shaped guiding member 34. A bracket 36 is secured on spindle 13 and extends therefrom in spaced parallel relation adjacent to the springs 31, 32. The bracket is formed with a slot in which an arm 37 is retained in movable relation in response to movement of a screw 38 operated by a nut 39. The arm carries a roller 41 which extends into the fork formed by the guide 34. The gear sector is thus flexibly and adjustably connected with the spindle 13 and the damping action of the disk 23 is transmitted to the spindle through the flexible connection above described.

When the regulator is connected as shown, as the potential of line 11 changes, a torque is produced on spindle 13 by the torque producing system connected with the line. Such torque acts against the recall or return spring 22 which tends to retain the spindle in predetermined position. Rotation of spindle 13 causes the cup 14 to rotate which thus causes the contact sector 17 to rock over the taps 18 for a distance dependent on the torque exerted on the spindle. Such rotation of spindle 13 is restrained by the damping action of disk 23 and magnet 26. The damping action transmitted to the spindle is adjusted by changing the position of roller 41 in guide 34. Lowering of the roller into the guide increases the friction between such parts which absorbs the kinetic energy of the torque producing system upon movement thereof and thus reduces the regulating action. As may be seen from consideration of the detailed view of the connection illustrated in Figs. 2 and 3, the length of the lever arm R and R' is changed but the angle A remains constant when the position of the roller 41 with the guide 34 is changed. When R is short, the angle A remaining constant, springs 31 and 32 are less highly stressed and the damping force acting on the spindle to retain the same in the median position shown in Fig. 1 is less than when R is lengthened as in Fig. 3. The curves illustrated in Fig. 4 are the recall torque plotted against the angle A. Thus when R is short, curves r are obtained and curves r' are obtained with the longer lever R'. Adjustment of the roller 41 to the position illustrated in Fig. 2 causes quicker functioning of the damping action and movement of the roller to the position illustrated in Fig. 3 reduces the speed of operation of the damping system. A sharp inclination of the adjustment curves is thus obtained within wide limits. Due to the deviation of the ascending and descending curves from each other, for each position of the roller, the kinetic energy of the regulator is more quickly absorbed and the regulating action is very much accelerated.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. An electric regulator comprising a torque producing system actuated by an electric value, a spindle actuated by said system, a regulating system actuated by said spindle, damping means mounted on said spindle, and means for connecting said spindle and said damping means to cause damping action on the movement of said torque producing system disproportional relative to the angle of rotation of said spindle.

2. An electric regulator comprising a torque producing system actuated by an electric value, a spindle actuated by said system, a regulating system actuated by said spindle, damping means mounted on said spindle, springs secured on said damping means, and means secured on said spindle and adjustably engaging said springs to vary the rate of action of said damping means.

3. An electric regulator comprising a torque producing system actuated by an electric value, a spindle actuated by said system, a regulating system actuated by said spindle, damping means mounted on said spindle, springs secured on said damping means, a bracket secured on said spindle and extending adjacent said springs, and means for adjustably connecting said springs and said bracket.

4. An electric regulator comprising a torque producing system actuated by an electric value, a spindle actuated by said system, a regulating system actuated by said spindle, damping means mounted on said spindle, springs secured on said damping means, a bracket secured on said spindle and extending adjacent said springs, and means for adjusting the connection of said springs with said bracket to vary the distance of such connection from the axis of said spindle.

5. An electric regulator comprising a torque producing system actuated by an electric value, a spindle actuated by said system, a regulating system actuated by said spindle, damping means mounted on said spindle, springs secured on said damping means, a bracket secured on said spindle and extending adjacent said springs, means for frictionally connecting said springs with said bracket, and means for adjusting the friction between said springs and said bracket.

6. An electric regulator comprising a torque producing system actuated by an electric value, a spindle actuated by said system, a regulating system actuated by said spindle, damping means mounted on said spindle, springs secured on said damping means, a bracket secured on said spindle and extending adjacent said springs, an arm extending from said bracket and frictionally engaging said springs, and means for adjusting the position of engagement of said springs and said arm to adjust the friction therebetween to vary the action of said damping means on said torque producing means.

HEINRICH GÜTTINGER.
ROBERT KELLER.
PIERRE MARTENET.